United States Patent Office 3,645,954
Patented Feb. 29, 1972

3,645,954
CATIONIC THERMOSETTING RESIN
Yutaka Terada, Takatsuki-shi, Masanobu Urata, Osaka, and Kumeo Yamamoto, Kyoto, Japan, assignors to Sumitomo Chemical Company, Ltd., Osaka, Japan
No Drawing. Filed Feb. 6, 1969, Ser. No. 797,230
Claims priority, application Japan, Feb. 10, 1968, 43/8,486
Int. Cl. C08g *20/20;* D21h *3/58*
U.S. Cl. 260—29.2                                    6 Claims

ABSTRACT OF THE DISCLOSURE

An aqueous cationic thermosetting resin solution is prepared by reacting an aliphatic dicarboxylic acid with a polyalkylenepolyamine, reacting the thus obtained polyamide intermediate with a lactam and further reacting an aqueous solution of the thus obtained block copolyamide with epichlorohydrin. The thus obtained resin solution is useful as an agent for improving a wet strength of paper, pigment retention aid and drainage improver, when applied to paper making, and further useful as a flocculant and shrink-proof agent.

---

This invention relates to a method for preparing an aqueous solution of a cationic thermosetting resin useful as an agent for improving a wet strength of paper, and more particularly a method for preparing an aqueous solution of a cationic thermosetting resin having a remarkable effect upon an improvement in a wet strength of paper when added to pulp slurry in paper making process.

U.S. Pat. 2,926,154 discloses a method for preparing an aqueous solution of a cationic thermosetting resin by reacting polyamide prepared from a saturated dicarboxylic acid and polyalkylenepolyamine, with epichlorohydrin, and that the thus prepared cationic thermosetting resin is useful as an agent for improving a wet strength of paper. The aqueous cationic thermosetting resin solution is obtained at a resin concentration of 10 to 30% according to said method. A satisfactory wet strength, however, cannot be obtained, when such solution is applied to paper, without increasing the viscosity of the thus obtained aqueous resin solution. However, when the viscosity of the aqueous resin solution is increased, the viscosity tends to increase with time and rapidly the aqueous resin solution starts to gel. To avoid these disadvantages, the aqueous resin solution must be prepared at a resin concentration of about 10% to decrease the apparent viscosity of the aqueous resin solution, but a volume of the product is inevitably made so large owing to such a low concentration of the aqueous product solution that commercial handling of the product solution such as transportation is considerably troublesome. These are disadvantages encountered in the resin prepared according to the prior art method. Accordingly, it has been heretofore proposed and effected that the aqueous resin solution having a relatively high resin concentration such as about 30% be prepared at the cost of some application effect, or pH of the resin solution be made to reside at an acidic side, for example, 6 or less, to make less the tendency to gel. However, these proposed measures have not successfully eliminated the tendency to gel and thus have not yielded satisfactory results.

One object of the present invention is to provide a method for preparing an aqueous resin solution having a low viscosity even at a high resin concentration and a remarkable effect upon an improvement in wet strength of paper. Other objects will be apparent from the following description.

In order to accomplish these objects the present invention provides a method for preparing an aqueous solution of a cationic thermosetting resin, which comprises reacting one mole of an aliphatic dicarboxylic acid as represented by the Formula I with 0.8 to 1.2 mole of a polyalkylenepolyamine as represented by the Formula II thereby to prepare a polyamide intermediate as represented by the Formula III, and reacting the thus obtained polyamide intermediate with a lactam as represented by the Formula IV thereby to prepare a block copolyamide as represented by the Formula V according to the following reaction formulae,

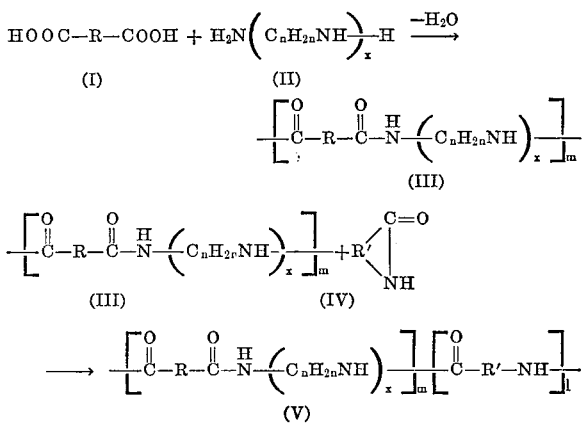

wherein $n$ and $X$ are integers of at least 2 respectively; $m$ and $l$ are integers of at least 1 respectively; R is a divalent aliphatic hydrocarbon group having 1 to 10 carbon atoms and R′ is a divalent aliphatic hydrocarbon group having 3 to 18 carbon atoms, and further reacting an aqueous solution of the thus prepared block copolyamide with epichlorohydrin. The latter reaction formula has not been made clear, but it seems that there preferentially takes place a ring opening addition reaction between the secondary amine group of the block copolyamide and the epoxy group of epichlorohydrin.

Further the present invention provides a method for producing a paper having an improved wet strength which comprises incorporating therein a cationic thermosetting resin prepared according to the method of the present invention and then curing the resin to a water-insoluble state.

Further the present invention provides a paper product having an improved wet strength prepared by the method of the present invention.

The present invention is hereunder explained in detail: in the present invention a polyamide intermediate is prepared at first by reacting one mole of aliphatic dicarboxylic acid with 0.8 to 1.2 mole of polyalkylenepolyamine. Then, the thus prepared polyamide intermediate is allowed to react with 0.1 to 0.5 mole of lactam in terms of one mole of the aliphatic dicarboxyl group in the polyamide intermediate, and as a result such a block copolyamide as represented by ABABABABCCC is obtained, wherein A is the aliphatic dicarboxyl group, B the polyalkylenepolyamine group and C the lactam group. In that case, it is necessary to select a suitable molar ratio of the lactam so that the resulting block polyamide may have a good water solubility. The molar ratio of the lactam depends upon a combination of the aliphatic dicarboxylic acid and polyalkylenepolyamine, but usually 0.1 to 0.5 mole of lactam is preferably as per one mole of the aliphatic dicarboxyl group in the polyamide intermediate.

On the other hand, U.S. Pat. 3,250,664 discloses a method for preparing a copolyamide directly from a mixture of dicarboxylic aid, polyalkylenepolyamine and lactam, and thus the copolyamide prepared in the method of U.S. 3,250,664 has a quite different structure of the block copolyamide prepared in the present method. That is it is a random copolyamide and does not show the properties as observed in the present invention.

Examples of the aliphatic dicarboxylic acid used in the present invention include saturated and unsaturated aliphatic dicarboxylic acids, such as succinic acid, adipic acid, azelaic acid, maleic acid, fumaric acid, and itaconic acid.

Examples of the polyalkylenepolyamine used in the present invention include diethylenetriamine, triethylenetetramine, tetraethylenepentamine, and iminobispropylamine.

Examples of the lactam used in the present invention include pyrrolidone and ε-caprolactam. Particularly, ε-caprolactam is advantageously used in the present invention from the industrial point of view.

The reaction temperature for reacting the aliphatic dicarboxylic acid with polyalkylenepolyamine is 100° to 250° C. preferably 130° to 200° C.

The reaction temperature for reacting the resulting polyamide intermediate with the lactam is likewise 100° to 250° C., preferably 130° to 200° C.

It is necessary that the resulting block copolyamide is water-soluble. The resulting block copolyamide is then allowed to react, in a state of an aqueous solution, with epichlorohydrin. The molar ratio of epichlorohydrin to react with the block copolyamide is preferably 1.5 to 2.0 per one mole of the secondary amine group in the block copolyamides. The reaction can be attained at 50° to 70° C. for 1 to 3 hours by adding a predetermined amount of epichlorohydrin dropwise to an aqueous solution of the block copolyamide. The apparent viscosity of the thus obtained aqueous condensation product solution depends upon a molar ratio of epichlorohydrin, time required for adding epichlorohydrin to the solution dropwise, temperature of epichlorohydrin addition and reaction time and temperature.

The aqueous condensaton product solution prepared according to the present invention has a low viscosity such as Gardner viscosity A or less at a resin concentration of 30%, but has satisfactory application effects, and thus it is desirable to stop the reaction when the resulting solution comes to have Gardner viscosity A or less.

The aqueous solution of novel cationic thermosetting resin prepared according to the present invention is stable even at a concentration as high as about 30%, as compared with the aqueous resin solution prepared according to the method of U.S. Pat. 2,926,154, and the present aqueous resin solution has an increased resin content per unit volume and this is very advantageous in handling such as transportation. Further, the present aqeos resin solution has a low viscosity such as Gardner A even at the high resin concentration such as 30%, and is stable for a long period of time without gelation. Furthermore, the present aqueous resin solution has more improved application effects upon paper than the aqueous resin solution prepared according to the conventional method.

The product resin solution prepared according to the present invention can be used as an agent for improving a wet strength of paper when applied to paper, an aid for retention of pigment added during the paper making process and a drainage improver used to increase the operating speed in paper making process, as well as a fluocculant for fine particles in industrial sewage or waste water, and a shrink-proof agent for preventing the shrinkage of woolen fabrics.

The present invention is hereunder explained, referring to Reference Examples and Examples. Reference Examples show the cases wherein the experiments were conducted according to the method disclosed in U.S. Pat. 2,926,154 and the concentration of the thus obtained aqueous resin solution was made equal to that of the resin solution obtained according to the present invention for comparison.

REFERENCE EXAMPLE 1

Into a 500 ml. four-necked flask with a thermometer, reflux condenser and stirrer were charged 113.4 g. (1.1 mole) of diethylene triamine, 50 g. of water and 146.1 g. (1.0 mole) of adipic acid. Temperature was elevated while distilling water. The reaction was conducted at 180° to 185° C. for 5 hours. Water was added to the reaction product to make a 50% aqueous solution of polyamide, which had a Gardner viscosity S (500 cps.).

Then, 42.6 g. (0.1 mole) of a 50% aqueous polyamide solution and 60 g. of water were charged to another flask. to which 13.9 g. (0.15 mole) of epichlorohydrin was added dropwise at 50° C. for a duration of 30 minutes. The flask was kept at 50° C. for 2 hours, and the reaction was completed. The thus obtained cationic resin aqueous solution had a 30% solid content, pH of 8.1 and Gardner viscosity B–C (75 cps.). The solid content was so high that the product resin solution gelled after one day when stored at room temperature (about 15° C.).

REFERENCE EXAMPLE 2

To part of the cationic resin aqueous solution obtained in Reference Example 1 was added hydrochloric acid to adjust pH to 5.7, and the pH-adjusted resin solution gelled after 5 days when stored at room temperature.

REFERENCE EXAMPLE 3

0.1 mole of 50% polyamide aqueous solution as obtained in Reference Example 1 was reacted with 0.15 mole of epichlorohydrin, and the reaction was stopped when the Gardner viscosity of the resulting 30% cationic resin aqueous solution reached "A" (50 cps.). Then, hydrochloric acid was added to the resin aqueous solution to adjust pH to 5.5. The pH-adjusted resin aqueous solution gelled after 15 days when stored at room temperature.

EXAMPLE 1

To a reaction apparatus similar to that used in Reference Example 1 were charged 113.4 g. (1.1 mole) of diethylenetriamine, 50 g. of water and 146.1 g. (1.0 mole) of adipic acid. Temperature was elevated while distilling water, and further elevated while adding 22.6 g. (0.2 mole) of ε-caprolactam thereto. The reaction was conducted at 170° to 175° C. for 2 hours, and water was added to the reaction product to make a 50% aqueous solution of block copolyamide. The thus obtained 50% block copolyamide aqueous solution had a Gardner viscosity P (400 cps.). To another flask were charged 0.1 mole of the 50% block copolyamide solution, water and 0.15 mole of epichlorohydrin to make the resulting resin solution have a resin concentration of 30%. The reaction was conducted at 50° C. for two hours, whereby a cationic resin aqueous solution having a solid content of 30%, pH of 7.7 and Gardner viscosity A–1 (32 cps.) was obtained. The solution was stable at room temperature for over 30 days.

EXAMPLE 2

To a flask were charged 0.1 mole of the 50% block copolyamide aqueous solution as obtained in Example 1, water and 0.15 mole of epichlorohydrin to make the resulting condensation product have a resin concentration of 30%. The reaction was conducted at 60° C. for 2 hours, whereby a cationic resin aqueous solution having a solid content of 30%, pH of 7.5 and Gardner viscosity A–1 to A (40 cps.) was obtained. The solution was stable at room temperature for over 30 days without gelation.

EXAMPLE 3

In a reaction apparatus similar to that used in Example 1, 1.05 mole of diethylenetriamine, 1.0 mole of itaconic acid and 30 g. of water were subjected to reaction at 150° to 155° C. for 2 hours, and then 0.2 mole of ε-caprolactam was added thereto and the reaction was further conducted at 170° to 175° C. for another two hours. Then, water was added to the reaction product, whereby a 50% block copolyamide solution having Gardner viscosity S (500 cps.) was obtained.

Then, 0.1 mole of the 50% block copolyamide aqueous solution, water and 0.17 mole of epichlorohydrin were charged to another flask to make the resulting resin solution have a resin concentration of 30%.

The reaction was conducted at 50° C. for three hours, whereby a cationic resin solution having a solid content of 30%, pH of 7.6 and Gardner viscosity of A-2 (22 cps.) was obtained. The solution was stable at room temperature for over 30 days.

EXAMPLE 4

Into a reaction apparatus similar to that used in Example 1 were charged 1.0 mole of diethylenetriamine and 1.0 mole of adipic acid, and the reaction was conducted at 175° to 185° C. for two hours. Then, 0.2 mole of pyrrolidone was added thereto, and reaction was further conducted at 175° to 185° C. for another one hour, and then cooled. Water was added thereto to make a 50% aqueous solution of the resulting block copolyamide. The solution had a Gardner viscosity Q (435 cps.).

Then, 0.1 mole of the 50% block copolyamide aqueous solution, water and 0.16 mole of epichlorohydrin were charged to another flask to make the resulting resin solution have a resin concentration of 30%. The reaction was conducted at 65° C. for 2 hours, whereby a cationic resin aqueous solution having a solid content of 30%, pH 7.8 and Gardner viscosity A-1 (32 cps.) was obtained. The solution was stable at room temperature for over 30 days without gelation.

APPLICATION EXAMPLE

Paper was prepared by means of a TAPPI handsheet machine using cationic resin aqueous solutions obtained in reference examples and examples at the following conditions, and the properties of the thus prepared paper were determined. The result is shown in Table 1.

Paper machine: TAPPI handsheet machine
Pulp: LBKP/NBKP=1:1 mixture
Canadian freeness: 433 cc.
Resin added: 1% based on pulp
Curing: 110° C., 10 min.

TABLE

| Sample | Wet breaking length (km.) | Wet tearing strength (kg./cm.²) |
|---|---|---|
| Control | 0.25 | 0 |
| Reference 1 | 1.74 | 0.89 |
| Reference 2 | 1.68 | 0.82 |
| Reference 3 | 1.51 | 0.63 |
| Example 1 | 1.95 | 1.21 |
| Example 2 | 2.02 | 1.35 |
| Example 3 | 1.99 | 1.09 |
| Example 4 | 1.92 | 1.12 |

We claim:

1. A method for preparing an aqueous solution of a cationic thermosetting resin, which comprises reacting an aliphatic carboxylic acid having 3 to 11 carbon atoms with a polyalkylenepolyamine having the formula $$H_2N(C_nH_{2n}NH)_xH$$

wherein $n$ and $X$ are integers of at least 2 at a temperature of 130° to 250° C. for a period of 1 to 10 hours, wherein the ratio of dicarboxylic acid to polyalkylenepolyamine is 1.0 mole: 0.8 to 1.2 mole to form a polyamide intermediate, combining the resulting polyamide intermediate with 0.1 to 0.5 mole of a lactam having 4 to 19 carbon atoms per 1 mole of the dicarboxyl group in the polyamide and reacting the mixture to form a block copolyamide, and thereafter reacting an aqueous solution of the resulting block copolyamide with 1.0 to 2.0 mole of epichlorohydrin per mole of the secondary amine group in the block copolyamide.

2. A method according to claim 1, wherein the aliphatic dicarboxylic acid is a saturated or unsaturated acid.

3. A method according to claim 1, wherein the polyalkylenepolyamine is is diethylenetriamine, triethylenetetramine, tetraethylenepentamine or iminobispropylamine.

4. A method according to claim 1, wherein the lactam is ε-caprolactam or pyrrolidone.

5. A method according to claim 1, wherein the aliphatic dicarboxylic acid is adipic acid, the polyalkylenepolyamine is diethylenetriamine; and the lactam is ε-caprolactam.

6. A method for producing a paper having an improved wet strength which comprises incorporating therein a cationic thermosetting resin prepared according to claim 1 and then curing the resin to a water-insoluble state.

References Cited

UNITED STATES PATENTS

| 2,926,154 | 2/1960 | Keim | 260—29.2 |
| 3,250,664 | 5/1966 | Conte et al. | 260—78 |
| 3,320,215 | 5/1967 | Conte et al. | 260—78 |
| 3,352,833 | 11/1967 | Earle | 260—29.2 |

OTHER REFERENCES

Floyd "Polyamide Resins," Reinhold, 1966, pp. 59 and 60.

JULIUS FROME, Primary Examiner

A. H. KOESKERT, Assistant Examiner

U.S. Cl. X.R.

117—155; 162—164; 210—54; 260—78 L, 78 SC, 857